United States Patent
Cho et al.

(10) Patent No.: US 10,343,315 B2
(45) Date of Patent: Jul. 9, 2019

(54) INSERT INJECTION MOLDING METHOD USING FIBER-REINFORCED COMPOSITE MATERIAL, AND INJECTION MOLDED PRODUCT USING SAME

(71) Applicant: LG HAUSYS, LTD., Seoul (KR)

(72) Inventors: Sang-Gyu Cho, Uiwang-si (KR); Yong-Kil Kil, Gimpo-si (KR); Dong-Won Kim, Gwangmyeong-si (KR); Yong-Han Kang, Seoul (KR); Hee-June Kim, Seongnam-si (KR); Hyun-Jin Choi, Ansan-si (KR); Kye-Woong Byun, Gwacheon-si (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 15/572,559

(22) PCT Filed: Feb. 16, 2016

(86) PCT No.: PCT/KR2016/001544
§ 371 (c)(1),
(2) Date: Nov. 8, 2017

(87) PCT Pub. No.: WO2016/182173
PCT Pub. Date: Nov. 17, 2016

(65) Prior Publication Data
US 2018/0117808 A1      May 3, 2018

(30) Foreign Application Priority Data

May 8, 2015   (KR) .................. 10-2015-0064856

(51) Int. Cl.
| | | |
|---|---|---|
| *B29C 45/14* | (2006.01) | |
| *B60R 19/18* | (2006.01) | |
| *B60R 19/03* | (2006.01) | |
| B29L 31/30 | (2006.01) | |
| B29K 105/06 | (2006.01) | |

(52) U.S. Cl.
CPC .... *B29C 45/14786* (2013.01); *B29C 45/1418* (2013.01); *B29C 45/14065* (2013.01);
(Continued)

(58) Field of Classification Search
CPC ........ B29C 45/14786; B29C 45/14065; B29C 45/1418; B29C 2045/14147; B60R 19/03;
(Continued)

(56) References Cited

U.S. PATENT DOCUMENTS 6,537,484 B2 * 3/2003 Nakagawa .......... B29C 33/0044
                                            264/250
9,487,227 B2 * 11/2016 Heitz ..................... B29C 70/52
(Continued)

FOREIGN PATENT DOCUMENTS

JP    H05-92442 A     4/1993
JP    H10-286841 A    10/1998
(Continued)

OTHER PUBLICATIONS

International Search Report for PCT/KR2016/001544 dated Apr. 6, 2016.

*Primary Examiner* — Pinel E Romain
(74) *Attorney, Agent, or Firm* — Hauptman Ham, LLP

(57) ABSTRACT

The present invention relates to an injection molding method using a fiber-reinforced composite material as an insert, and an injection molded product, and provides an injection molding method comprising: a step of preparing a fiber-reinforced composite material having a high-strength fiber, which is an insert material, impregnated in a resin; an insert formation step of manufacturing an insert by molding the fiber-reinforced composite material into a preliminary shape; and an injection molding step of manufacturing an injection product by arranging the insert in an injection mold and injecting a resin.

6 Claims, 6 Drawing Sheets

(52) U.S. Cl.
CPC .............. *B60R 19/03* (2013.01); *B60R 19/18* (2013.01); *B29C 2045/14147* (2013.01); *B29K 2105/06* (2013.01); *B29L 2031/3044* (2013.01); *B60R 2019/1853* (2013.01)

(58) Field of Classification Search
CPC ........ B60R 2019/1853; B29K 2105/06; B29L 2031/3044
USPC .............................................. 296/187.01, 191
See application file for complete search history.

(56) References Cited

U.S. PATENT DOCUMENTS

| | | | | |
|---|---|---|---|---|
| 9,821,739 | B2 * | 11/2017 | Yabu | ........................ B60R 19/03 |
| 2007/0077379 | A1 * | 4/2007 | Passera | ................ B29C 45/1706 |
| | | | | 428/35.7 |
| 2014/0203468 | A1 * | 7/2014 | Humphries | .............. C04B 26/14 |
| | | | | 264/71 |
| 2014/0333077 | A1 * | 11/2014 | Kil | .......................... B60R 19/03 |
| | | | | 293/132 |
| 2015/0015005 | A1 | 1/2015 | Shin | |
| 2015/0284035 | A1 * | 10/2015 | Reese | .................. B62D 29/043 |
| | | | | 296/193.02 |

FOREIGN PATENT DOCUMENTS

| | | | |
|---|---|---|---|
| JP | 2013-28159 | A | 2/2013 |
| KR | 10-2008-0023791 | A | 3/2008 |
| KR | 10-2011-0096859 | A | 8/2011 |
| KR | 10-2013-0132420 | A | 12/2013 |
| KR | 10-1372004 | B1 | 3/2014 |

* cited by examiner

INSERT INJECTION MOLDING METHOD USING FIBER-REINFORCED COMPOSITE MATERIAL, AND INJECTION MOLDED PRODUCT USING SAME

CROSS REFERENCE TO RELATED APPLICATION

This present application is a national stage filing under 35 U.S.C § 371 of PCT application number PCT/KR2016/001544 filed on Feb. 16, 2016 which is based upon and claims the benefit of priority to Korean Patent Application No. 10-2015-0064856 filed on May 8, 2015 in the Korean Intellectual Property Office. The disclosures of the above-listed applications are hereby incorporated by reference herein in their entirety.

TECHNICAL FIELD

The present invention relates to an insert injection molding method and an injection molded product using the method, and more particularly, to an injection molding method using a fiber-reinforced composite material as an insert and an injection molded product.

BACKGROUND ART

A fiber-reinforced composite material is a high-performance material that is enhanced in strength by impregnating high-strength fiber such as glass fiber, carbon fiber, aramid, or Kevlar in a polymer matrix material such as plastic or epoxy.

The fiber-reinforced composite material is advantageous in a reduction in weight and an increase in strength, but is disadvantageous in that a realizable shape is limited, so that the freedom of design is low.

For example, a bumper back-beam made of a general plastic material is more excellent in freedom of design, is lighter in weight, and is lower in cost than a metal material. However, the bumper back-beam made of the plastic material is lower in rigidity, so that crashworthiness is insufficient.

Meanwhile, if the bumper back-beam is made of a fiber-reinforced composite material, a high rigidity is obtained, so that crashworthiness is enhanced. However, the bumper back-beam made of the fiber-reinforced composite material is problematic in that the freedom of design is limited, so that it is difficult to manufacture the bumper back-beam as a single product. Thus, since some components should be separately formed and then assembled with each other, this leads to an increase in cost and an insufficient weight-lightening effect.

The present invention is intended to provide an insert injection molding method using a fiber-reinforced composite material, which employs the fiber-reinforced composite material as an insert, thus being high in freedom of design, increasing a strength, and reducing a weight, and an injection molded product using the method.

DISCLOSURE

Technical Problem

Accordingly, the present invention has been made keeping in mind the above problems occurring in the related art, and is intended to provide an injection molding method using a fiber-reinforced composite material as an insert and an injection molded product using the method.

The present invention is intended to provide a method of manufacturing an injection molded product, which is high in freedom of design and realizes both a high strength and a light weight.

Technical Solution

In an aspect, the present invention provides an injection molding method including a step of preparing a fiber-reinforced composite material having a high-strength fiber, which is an insert material, impregnated in a resin; an insert formation step of manufacturing an insert by molding the fiber-reinforced composite material into a preliminary shape; and an injection molding step of manufacturing an injection product by putting the insert into an injection mold and injecting a resin.

At the insert formation step, a support groove may be formed in the insert, and a support protrusion inserted into the support groove may be provided on the injection mold of the injection molding step, so that, in a state where the insert may be coupled to the support protrusion at the injection molding step, the resin may be injected, thus preventing the insert from being deformed during an injection molding process.

A support groove formed on the insert may be provided around a through-hole formed in the insert, or provided on a portion on which injection pressure of the injection mold may concentrate.

The support groove may be foamed as a through-hole, and the support protrusion may be formed in multiple stages such that a portion thereof may be inserted into the through-hole.

The resin of the fiber-reinforced composite material and the resin injected into the injection mold may be of the same kind.

In another aspect, the present invention provides an injection molded product used as a bumper back-beam, wherein a fiber-reinforced composite material may be embedded as an insert into a section requiring a high strength.

The injection molded product may be configured such that a metal plate having a guide pin formed on a connecting surface coupled to a vehicle body may be embedded into the insert.

The metal plate may include a through-hole, the through-hole being filled with injection resin.

Advantageous Effects

The insert injection molding method and the injection molded product using the method according to the present invention are advantageous in that the fiber-reinforced composite material is employed as the insert material, thus attaining high strength and freedom of design.

The bumper back-beam manufactured by the insert injection molding method according to the present invention does not require the assembly of additional members, thus realizing a reduction in weight and cost.

Figure 1:
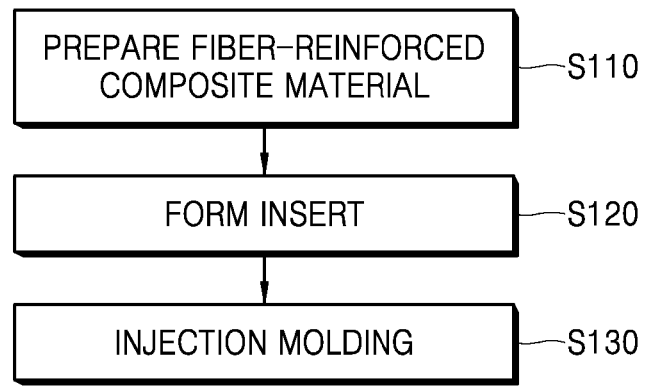
FIG. 1 is a process flowchart illustrating an insert injection molding method using a fiber-reinforced composite material according to the present invention.

*Description of reference numerals of important parts*

| | |
|---|---|
| S110: | fiber-reinforced composite material preparing step |
| S120: | insert forming step |
| S130: | injection molding step |
| 10: | fiber-reinforced composite material |
| 12, 14: | support groove |
| 100: | lower mold |
| 110: | holder |
| 120, 130: | support protrusion |
| 132: | large-diameter part |
| 134: | small-diameter part |
| 200: | upper mold |
| 300: | bumper back-beam |
| 310: | through-hole |
| 312: | support groove |
| 400: | metal plate insert |
| 410: | guide pin |
| 420: | through-hole |

MODE FOR INVENTION

The terms or words used in the description and the claims of the present invention should not be interpreted as being limited merely to common and dictionary meanings. On the contrary, they should be interpreted based on the meanings and concepts of the invention in keeping with the scope of the invention on the basis of the principle that the inventor(s) can appropriately define the terms in order to describe the invention in the best way. While the invention will be described in conjunction with exemplary embodiments, it should be understood that the invention is not limited to those exemplary embodiments but covers various alternatives, modifications, equivalents and other embodiments within the spirit and scope of the invention as defined by the appended claims.

FIG. 1 is a process flowchart illustrating an insert injection molding method using a fiber-reinforced composite material according to the present invention.

The insert injection molding method according to the present invention may obtain a high strength for a molded product by using the fiber-reinforced composite material as an insert, and may realize a complicated shape by injection molding, thus enhancing the freedom of design.

As illustrated in the drawing, the insert injection molding method according to the present invention includes a step S110 of preparing a fiber-reinforced composite material, an insert formation step S120, and an injection molding step S130.

The fiber-reinforced composite material preparing step S110 is the step of manufacturing the fiber-reinforced composite material that is to be used as the insert. The fiber-reinforced composite material is made by impregnating a polymer resin, which is a matrix material, in reinforced fiber. The fiber-reinforced composite material is generally manufactured in the shape of a plate or sheet. However, excessive cost and efforts are required to make the composite material in a special shape.

The present invention uses the fiber-reinforced composite material as the insert material. At the fiber-reinforced composite material preparing step S110, the fiber-reinforced composite material in the shape of the plate or sheet is prepared, and then is cut to a desired size.

Next, the insert formation step S120 is a step of forming the prepared fiber-reinforced composite material into a preliminary shape. If the injection molded product has the shape of the plate, a separate preliminary shape is not required. However, if the injection molded product has a predetermined three-dimensional shape, the fiber-reinforced composite material should be formed into the preliminary shape.

The fiber-reinforced composite material may be formed into the preliminary shape by heating the fiber-reinforced composite material and then pressing it with a mold. Although the fiber-reinforced composite material may be formed using a separate mold, the fiber-reinforced composite material may be usually formed into a predetermined shape using an injection mold.

Next, the injection molding step S130 is the step of putting the insert, which is the fiber-reinforced composite material formed into the preliminary shape, into the mold, injecting the injection resin and consequently finishing the injection molded product. Since the complicated shape is provided in the injection mold, it is possible to realize the complicated shape with a single component. Thus, the freedom of design is enhanced and a cost reduction is achieved, as compared to the case of manufacturing the product using only the fiber-reinforced composite material.

Figure 2:
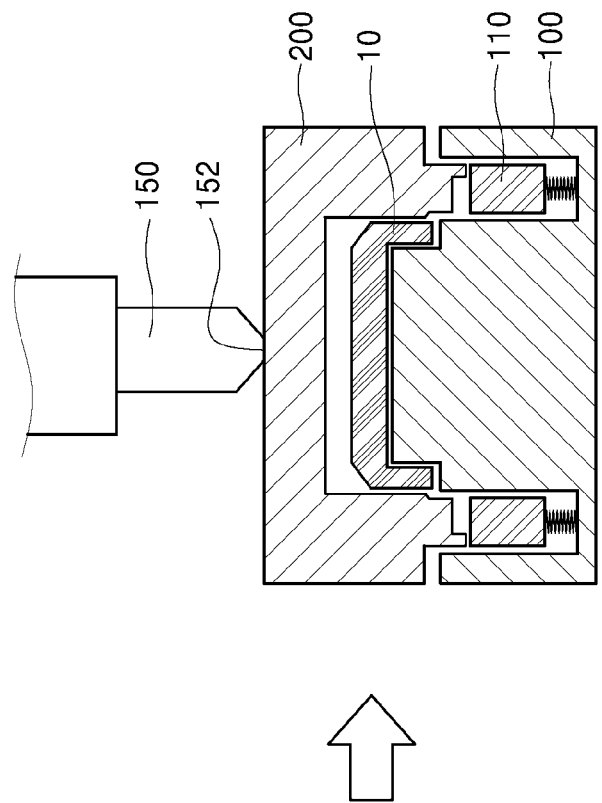
FIG. 2 is a view illustrating a process of forming the fiber-reinforced composite material using an injection mold in the insert injection molding method according to the present invention.
Figure 2:
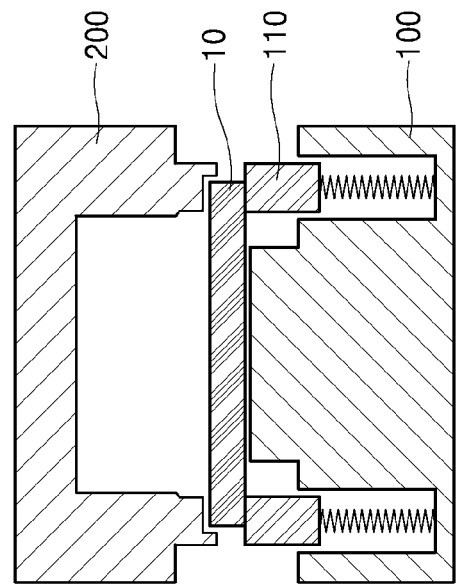

FIG. 2 is a view illustrating the process of forming the fiber-reinforced composite material using the injection mold in the insert injection molding method according to the present invention.

In the case of using a thermoplastic resin as the resin of the fiber-reinforced composite material, it is possible to form a desired shape by heating and pressing the fiber-reinforced composite material.

Therefore, after the fiber-reinforced composite material 10 is heated, the fiber-reinforced composite material 10 is put into a lower mold 100 for injection molding, and then pressed by an upper mold 200, thus forming a desired shape.

A holder 110 is provided in the lower mold 100 to be elastically supported, so that the fiber-reinforced composite material 10 is preferably fixed between the upper mold 200 and the holder 110.

Further, in the state where the upper and lower molds 200 and 100 are closed, the resin for injection molding is injected into a gate 152 of the upper mold 200 using a resin injection device 150 and then is molded, thus finishing the manufacture of the molded product.

Figure 3:
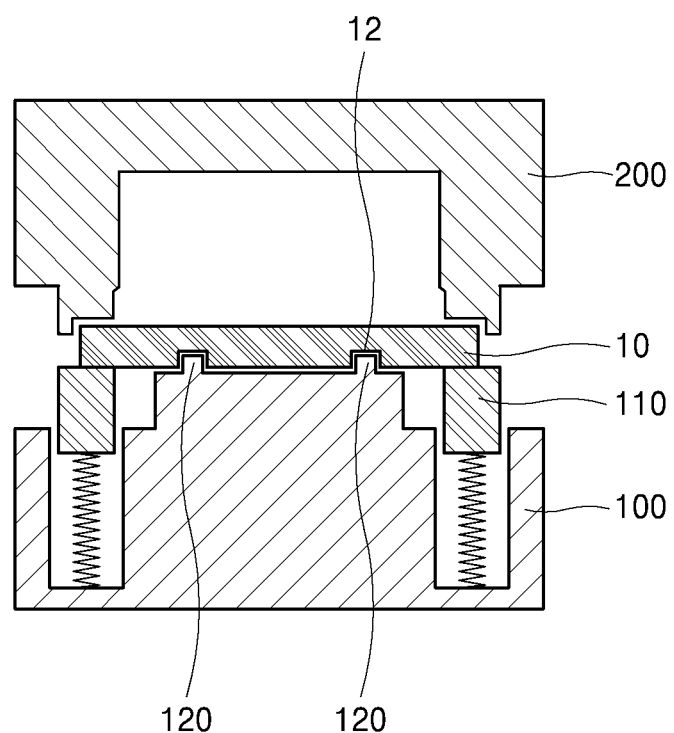
FIG. 3 is a view illustrating a method of fixing the fiber-reinforced composite material that is an insert in the insert injection molding method according to the present invention.

FIG. 3 is a view illustrating a method of fixing the fiber-reinforced composite material that is the insert in the insert injection molding method according to the present invention.

In a state where the fiber-reinforced composite material as the insert is put into the mold for the injection molding, the injection molding resin is injected to produce the injection molded product. The fiber-reinforced composite material 10 around the gate 152 (see FIG. 2) into which the resin is injected may be deformed, for example, pushed backwards by the injection pressure of the resin.

Further, if the injection molded product is provided in the through-hole, the fiber-reinforced composite material around the through-hole may be poorly molded while being pushed out by the injection pressure of the resin.

In order to solve the problem, according to the present invention, at the insert formation step, the support groove 12 is formed in the fiber-reinforced composite material, and the support protrusion 120 inserted into the support groove 12 is provided on the lower mold 100 into which the fiber-reinforced composite material 10 that is the insert is put. Therefore, the support protrusion 120 formed on the lower mold 100 is preferably coupled to the support groove 12 formed in the fiber-reinforced composite material, thus allowing the fiber-reinforced composite material 10 that is the insert material to maintain a constant shape without being changed in shape by the pressure of the resin.

Preferably, the support groove 12 and the support protrusion 120 are arranged around the gate into which the resin is injected or the through-hole formed in the molded product, thus stably fixing portions in which defective molding may be produced.

Figure 4:
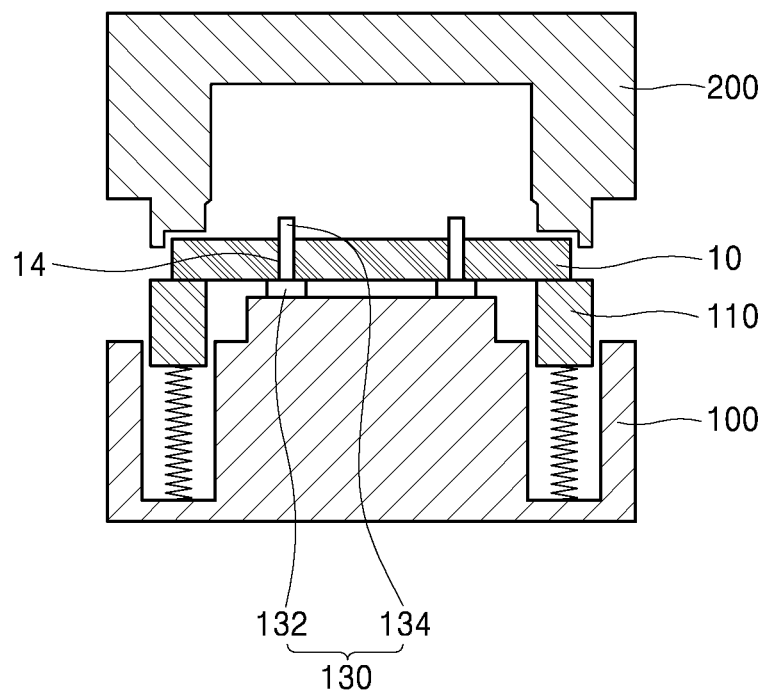
FIG. 4 is a view illustrating a method of fixing the fiber-reinforced composite material that is the insert in the insert injection molding method according to the present invention.

FIG. 4 is a view illustrating the method of fixing the fiber-reinforced composite material that is the insert in the insert injection molding method according to the present invention.

As illustrated in the drawing, the support groove 14 formed on the fiber-reinforced composite material 10 is formed as the through-hole, and the support protrusion 130 is formed in multiple stages, thus causing the fiber-reinforced composite material 10 that is the insert to be spaced apart from the lower mold by a predetermined distance.

Of course, the support groove 14 may not be formed in the shape of the through-hole similarly to the above-mentioned embodiment, but may be formed in the shape of a groove.

The support protrusion 130 includes a small-diameter part 134 that corresponds to an inner diameter of the support groove 14 and is inserted into the support groove 14, and a large-diameter part 132 that is formed to have a sectional area larger than the support groove 14 and is supported into the support groove 14 without being inserted therein.

If a gap is created between the fiber-reinforced composite material 10 that is the insert material and the lower mold 100, the injected resin fills the gap. Therefore, while both sides of the fiber-reinforced composite material 10 are surrounded by the injected resin, it is possible to manufacture the injection molded product that is shaped such that the insert is not exposed to the outside and is embedded.

Figure 5:
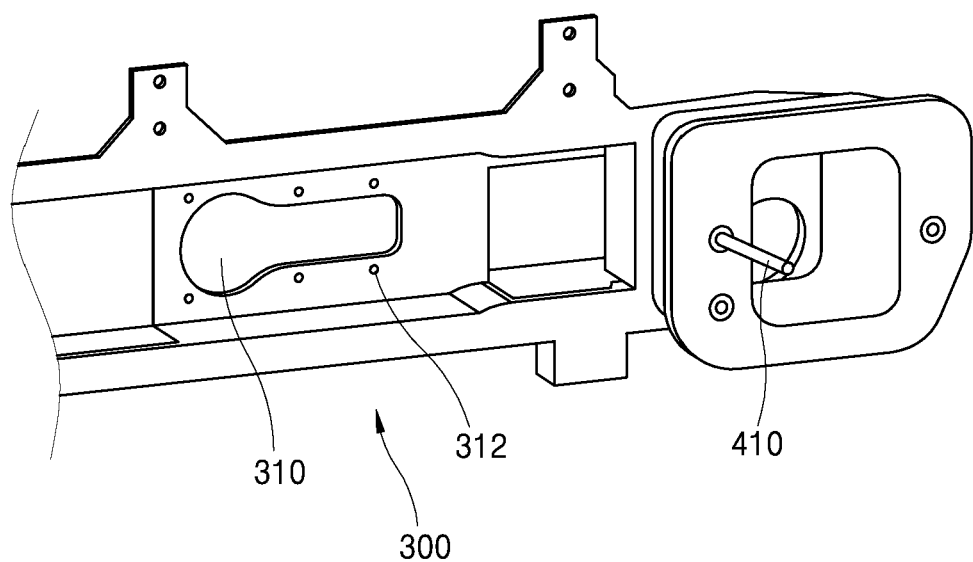
FIG. 5 is a view illustrating a bumper back-beam produced by the insert injection molding method according to the present invention.

FIG. 5 is a view illustrating a bumper back-beam produced by the insert injection molding method according to the present invention.

Conventionally, the bumper back-beam is made of a metal material. However, for the purpose of reducing a cost and a weight, the bumper back-beam of a plastic material is being developed.

In the case of manufacturing the bumper back-beam using a general plastic material by injection molding, the freedom of design is increased, so that it is possible to manufacture the bumper back-beam having the complicated shape as a single component, and thereby the effect of reducing a cost and a weight is great. However, the general plastic material has a limited strength, so that it is difficult to attain satisfactory crashworthiness.

Further, in the case of manufacturing the bumper back-beam using the fiber-reinforced composite material, it is possible to realize a high strength and thereby it is advantageous in crashworthiness. However, this has a limited freedom of design and has a difficulty in manufacturing the complicated shape as a single component, so that additional components should be separately assembled with each other and thereby it is disadvantageous in cost and weight.

However, since the insert injection molding method according to the present invention uses the fiber-reinforced composite material as the insert and the complicated shape is implemented through injection molding, it is possible to integrate components of the complicated shape into a single structure, in addition to realizing a required crashworthiness.

As shown in the drawing, the fiber-reinforced composite material as the insert is embedded into the bumper back-beam 300, so that it is possible to attain a required strength and to integrate exterior complicated shapes by injection molding.

In the drawing, it can be seen that the support groove 312 is formed around the through-hole 310. As described above, this prevents the fiber-reinforced composite material around the through-hole 310 from being deformed during an injection molding process.

Meanwhile, a metallic insert may be further provided on a portion at which the bumper back-beam is coupled to a vehicle body.

A guide pin 41 is required for a portion at which the bumper back-beam is coupled to the vehicle body. It is possible to manufacture the bumper back-beam integrated with the guide pin 410 by integrating the guide pin 410 with the metal plate, embedding the metal plate into the insert and then performing the injection molding.

Figure 6:
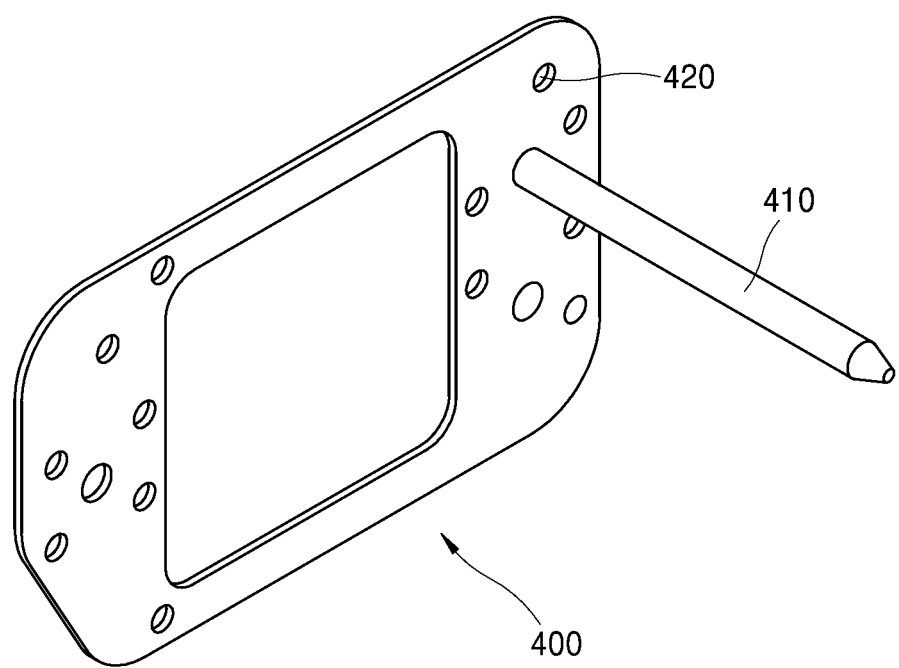
FIG. 6 is a view illustrating a metal plate insert used in the bumper back-beam produced by the insert injection molding method according to the present invention.

FIG. 6 is a view illustrating a metal plate insert used in the bumper back-beam produced by the insert injection molding method according to the present invention.

As shown in the drawing, the metal plate 400 inserted into the bumper back-beam has the guide pin 410 that is integrally formed thereon, and a plurality of through-holes 420.

Since the injection molding resin is filled in the through-hole 420 during the injection molding, the metal plate 400 is more firmly embedded, thus solving a problem wherein interfaces are separated from each other in the event of a collision.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An injection molding method comprising:
   a step of preparing a fiber-reinforced composite material having a high-strength fiber, which is an insert material, impregnated in a resin;
   an insert formation step of manufacturing an insert by heating the fiber-reinforced composite material, putting the fiber-reinforced composite material between an upper mold and a lower mold, and pressing the fiber-reinforced composite material by the upper mold into a preliminary shape; and
   an injection molding step of manufacturing an injection product by injecting the resin into the upper mold in when the upper and lower molds are closed.

2. The injection molding method according to claim 1, wherein, at the insert formation step, a support groove is formed in the insert, and
   a support protrusion inserted into the support groove is provided on the lower mold of the injection molding step, so that, in a state where the insert is coupled to the support protrusion at the injection molding step, the resin is injected, thus preventing the insert from being deformed during an injection molding process.

3. The injection molding method according to claim 2, wherein the support protrusion formed on the lower mold is provided around a through-hole formed in the insert.

4. The injection molding method according to claim 2, wherein the support protrusion formed on the lower mold is provided on a portion on which injection pressure of the injection mold concentrates.

5. The injection molding method according to claim 2, wherein the support protrusion is formed in multiple stages so that a portion thereof is inserted into the support groove.

6. The injection molding method according to claim 1, wherein the resin of the fiber-reinforced composite material and the resin injected into the lower mold and the upper mold are of the same kind.

* * * * *